United States Patent
Tamura

(10) Patent No.: US 8,688,315 B2
(45) Date of Patent: Apr. 1, 2014

(54) NUMERICAL ANALYSIS METHOD OF A VEHICLE DRIVE

(75) Inventor: Hiroshi Tamura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 100 days.

(21) Appl. No.: 13/513,221

(22) PCT Filed: Nov. 15, 2010

(86) PCT No.: PCT/IB2010/002910
§ 371 (c)(1),
(2), (4) Date: Jun. 1, 2012

(87) PCT Pub. No.: WO2011/067644
PCT Pub. Date: Jun. 9, 2011

(65) Prior Publication Data
US 2012/0239245 A1    Sep. 20, 2012

(30) Foreign Application Priority Data
Dec. 4, 2009    (JP) .................................. 2009-277066

(51) Int. Cl.
*G01M 17/00*    (2006.01)
(52) U.S. Cl.
USPC ................ 701/32.1; 702/12; 703/2; 165/80.3
(58) Field of Classification Search
USPC ......... 701/32.1, 100; 703/2; 165/80.3; 702/1, 702/12, 50, 100
See application file for complete search history.

(56) References Cited

U.S. PATENT DOCUMENTS 5,740,463 A * 4/1998 Oshima et al. .................. 712/11
6,405,142 B1   6/2002 Ogawa et al.
(Continued)

FOREIGN PATENT DOCUMENTS

JP    4-15761    1/1992
JP    2000-57127    2/2000
(Continued)

OTHER PUBLICATIONS

H. Long et al., "Operating Temperatures of Oil-lubricated Medium-speed gears: Numerical Models and Experimental Results," Proc. Instn. Mech. Engrs., vol. 217, Part G: J. Aerospace Engineering, pp. 87-106 (2003).

(Continued)

*Primary Examiner* — Helal A Algahaim
*Assistant Examiner* — Shardul Patel
(74) *Attorney, Agent, or Firm* — Finnegan, Henderson, Farabow, Garrett & Dunner, LLP

(57) ABSTRACT

A first analyzing step is a step that conducts numerical analysis of a flow field but does not conduct numerical analysis of a temperature field in a state in which a motor rotor is rotating. The second analyzing step is a step that conducts numerical analysis of both the flow field and the temperature field after the first analyzing step ends. Accordingly, before numerical analysis of the flow field and numerical analysis of the temperature field are conducted together, numerical analysis is conducted first on the flow field in first analyzing step before it is conducted on the temperature field. As a result, compared with when the second analyzing step is executed from the beginning without conducting the first analyzing step, the calculation load of the numerical analysis on an electronic calculator can be reduced, which enables the time that it takes to conduct the numerical analysis to be shortened.

8 Claims, 8 Drawing Sheets

(56) References Cited

U.S. PATENT DOCUMENTS

| | | | |
|---|---|---|---|
| 7,430,500 B2 * | 9/2008 | Lei et al. | 703/9 |
| 8,548,774 B2 * | 10/2013 | McLuckie | 703/1 |
| 2005/0284721 A1 * | 12/2005 | Arcot et al. | 192/70.12 |
| 2006/0089803 A1 * | 4/2006 | Lei et al. | 702/1 |

FOREIGN PATENT DOCUMENTS

| | | |
|---|---|---|
| JP | 2002-117018 | 4/2002 |
| JP | 2008-111482 | 5/2008 |
| JP | 2009-98030 | 5/2009 |
| WO | WO 2004/061723 A1 | 7/2004 |
| WO | WO 2006/123149 A2 | 11/2006 |

OTHER PUBLICATIONS

International Search Report in International Application No. PCT/IB2010/002910; Mailing Date: Apr. 14, 2011.

Written Opinion of the International Searching Authority in International Application No. PCT/IB2010/002910; Mailing Date: Apr. 14, 2011.

Applicant's Response to Written Opinion in International Application No. PCT/IB2010/002910 (Jul. 21, 2011.).

* cited by examiner

FIG. 1
FIG. 2
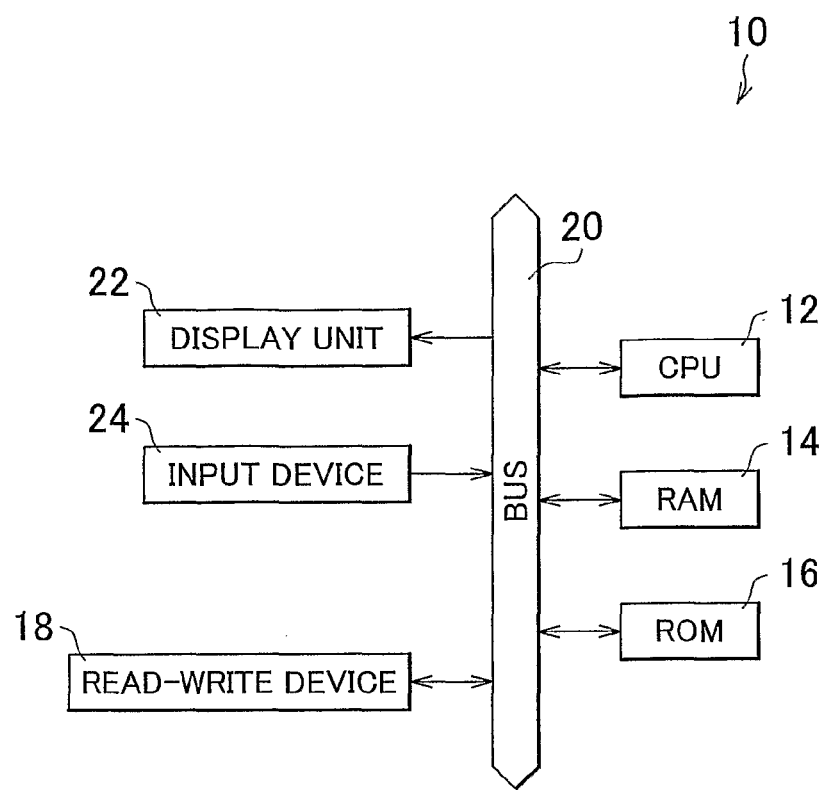
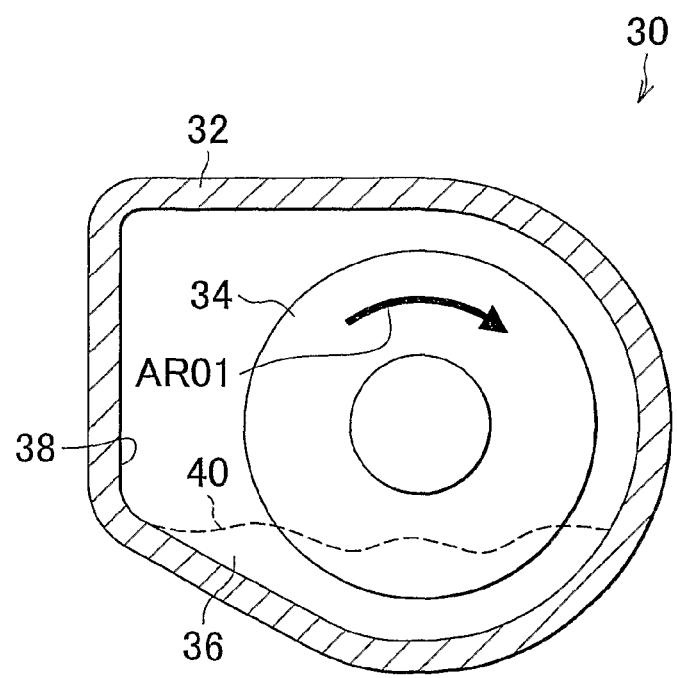

| PHENOMENON<br>TECHNICAL FIELD | | FREE SURFACE | ROTATIONAL TRANSFER | HEAT TRANSFER |
|---|---|---|---|---|
| AUTOMOTIVE | WIND FLOW | N/A | ○ | ○ |
| FOUNDRY | MOLTEN FLOW | ○ | N/A | ○ |
| DRIVING | OIL FLOW | ○ | ○ | NOT CONSIDERED |

STEP(1) CALCULATE ONLY FLOW FIELD → UNTIL QUASISTEADY → STEP(2) CALCULATE ONLY TEMPERATURE FIELD → UNTIL THERMAL EQUILIBRIUM → STEP(3) CALCULATE FLOW FIELD + TEMPERATURE FIELD

NUMERICAL ANALYSIS METHOD OF A VEHICLE DRIVE

CROSS-REFERENCE TO RELATED APPLICATIONS

This application is a national phase application of International Application No. PCT/IB2010/002910, filed Nov. 15, 2010, and claims the priority of Japanese Application No. 2009-277066, filed Dec. 4, 2009, the content of both of which is incorporated herein by reference.

BACKGROUND OF THE INVENTION

1. Field of the Invention

The invention relates to method for numerically analyzing a flow field and a temperature field of fluid in a vehicle drive unit. More particularly, the invention relates to technology for quickly performing that numerical analysis.

2. Description of the Related Art

Japanese Patent Application Publication No. 4-15761 (JP-A-4-15761), International Publication No. WO 2004/061723A1, and Japanese Patent Application Publication No. 2002-117018 (JP-A-2002-117018) and the like describe art related to the invention. Of these, JP-A-4-15761 describes an analysis method that uses a CAE/CAD/CAM system that integrates the heat flux and obtains the temperature change in a cold cycle structure in which the heat flux and the mold temperature changes from moment to moment, based on a three-dimensional analytical model of that cold cycle structure. For example, the analysis method described above may be applied to CAE analysis of a cold cycle of an injection mold, or the like.

The analysis method described in JP-A-4-15761 takes into account the two elements of heat transfer and free surface that is the surface boundary of molten resin or the like with respect to the air. Here, CAE analysis (numerical analysis) may be performed on a vehicle drive unit that includes a moving body that moves inside of a case, and a cooling medium that is a fluid that fills a portion of the inside of the case and contacts at least a portion of the moving body. With this vehicle drive unit, because the cooling medium does not fill up the entire whole of the inside of the case, it has a free surface that is not constrained by the inside wall of the case. The cooling medium is agitated or the like by the movement of the moving body. Therefore, when numerically analyzing the flow of the cooling medium and heat transfer in the vehicle drive unit in which heat from the moving body is dissipated outside the case, it is necessary to take the three elements of free surface, heat transfer, and the movement of the moving body, e.g., the rotational transfer of the gears, into account. Therefore, just like the analysis method described in JP-A-4-15761 that only takes the two elements of free surface and heat transfer into account, numerical analysis is unable to be performed. As a result, in the vehicle drive unit, the calculation load of the numerical analysis on the electronic calculator becomes enormous, so the time required to perform the numerical analysis becomes extremely long. This is thought to be because the flow of the cooling medium that is agitated or the like by the movement of the moving body reaches a steady state in a short elapsed time of that system, but it takes a long time for the temperature of the cooling medium to reach a steady state, i.e., the time scales of these are very different from each other.

Also, as shown in the last row in FIG. 8, conventionally CAE analysis (numerical analysis) has been performed on the oil flow in a drive system. However, while that CAE analysis does take the free surface and rotational transfer into account, it does not take heat transfer into account. Also, as CAE analysis performed conventionally in another technical field, there is CAE analysis of vehicle wind flow for evaluating the cooling performance of the brakes that brake the wheels of the vehicle, for example. However, as shown in the first row in FIG. 8, with CAE analysis for vehicle wind flow, while the heat transfer and the rotational transfer of the wheels and the brake discs and the like are taken into account, it is not necessary to take the free surface of the fluid into account. That is, as shown in FIG. 8, the related CAE analysis does not take into account all three of the elements of the free surface of the fluid, heat transfer, and rotational transfer of the moving body as the phenomena to be analyzed. Also, supposing that CAE analysis is performed on the temperature change of a liquid that fills a portion of the inside of a hollow pipe when that liquid flows from one end to the other end of that hollow pipe, the three elements of free surface, heat transfer, and flowrate are taken into account. However, although the flowrate of the liquid inside the hollow pipe at that time does not change over time, even if the free surface of the cooling medium is stable in the vehicle drive unit, the flowrate within the cooling medium changes over time due to the movement of the moving body, so CAE analysis for the hollow pipe could not be applied to the vehicle drive unit.

In view of this, when performing CAE analysis on cooling medium flow or heat transfer in a vehicle drive unit, the inventor came up with an undisclosed CAE analysis method (i.e., numerical analysis method) by which numerical analysis of the flow field of the cooling medium is performed separately from numerical analysis of the temperature field of the cooling medium, in order to shorten the time required to perform the CAE analysis. Using a rotor of an electric motor that generates heat by conducting electricity and rotates about an axis as the moving object, and cooling oil that contacts a portion of the rotor as the cooling medium, for example, this numerical analysis method numerically analyzes the flow field that takes into account the free surface of the cooling oil and the rotational transfer of the rotor, separately from the temperature field that takes into account the heat transfer, as shown in FIG. 9. In FIG. 9, in STEP [1], i.e., the first step, the numerical analysis for only the flow field is conducted until that flow field becomes quasisteady. Then in STEP [2], i.e., the second step, the flow field is maintained as it is after STEP [1] ends and numerical analysis for only the temperature field is conducted until the temperature field reaches thermal equilibrium. Then finally in STEP [3], i.e., the third step, numerical analysis of the flow field and numerical analysis of the temperature field are conducted together. Here, the term quasisteady above refers to the fact that on a microscopic level, the flow of the cooling medium while it is being agitated is not steady but rather is changing over time, while on a macroscopic level, the liquid surface is stable and does not change substantially over time.

Upon performing numerical analysis according to the steps in FIG. 9, in STEP [2], the total amount of heat dissipated in the temperature field becomes larger with respect to the amount of heat generated as the number of calculation cycles of the numerical analysis increases, i.e., as the set time passes in the numerical analysis, as shown in FIG. 10, so the temperature field is unable to reach thermal equilibrium in STEP [2]. This is thought to be due to the fact that the flow field and the temperature field are analyzed separately in this numerical analysis even though there is a correlation between the flow field and the temperature field. That is, a change in the temperature of the cooling oil will cause a change in the viscosity of the cooling oil, which in turn will cause a change in the flow of the cooling oil, and a change in the flow of the cooling oil will change the ease with which heat is transferred between the cooling oil and the case or the rotor. As a result, adequate results may not be able to be obtained when numerical analysis of the flow field and numerical analysis of the temperature field are simply performed separately.

SUMMARY OF INVENTION

In view of these problems, the invention provides a numerical analysis method for a vehicle drive unit, that, when numerically analyzing the flow field and the temperature field in the vehicle drive unit, is able to shorten the time that it takes to conduct the numerical analysis compared with when the flow field and the temperature field are numerically analyzed simultaneously from the beginning.

A first aspect of the invention relates to a numerical analysis method of a vehicle drive unit that is provided with a moving body that moves inside a case and a cooling medium that is a fluid that fills a portion of the inside of the case and contacts at least a portion of the moving body, and in which the temperature of the fluid medium rises as the moving body continues to move, the numerical analysis method numerically analyzing a temperature field of the cooling medium and a flow field of the cooling medium. This numerical analysis method of a vehicle drive unit includes a first analyzing step that conducts numerical analysis of the flow field but does not conduct numerical analysis of the temperature field in a moving state in which the moving body is moving; and a second analyzing step that conducts both numerical analysis of the flow field and numerical analysis of the temperature field in the moving state, after the first analyzing step ends.

Accordingly, in the vehicle drive unit, the convergence of the temperature field is higher than that of the flow field, while the steadiness of the temperature field is lower than that of the flow field. However, before conducting both the numerical analysis of the flow field and the numerical analysis of the temperature field together, numerical analysis is conducted on the flow field in the first analyzing step before it is conducted on the temperature field. As a result, compared with when numerical analysis of the flow field and numerical analysis of the temperature field are conducted together from the start, the calculation load of the numerical analysis can be reduced, so the time that it takes to conduct the numerical analysis is able to be shortened. That is, the flow field and the temperature field of the vehicle drive unit can be calculated appropriately while suitable analysis results that take into account the correlation between the flow field and the temperature field are obtained.

Here, the numerical analysis method of a vehicle drive unit may also include a third analyzing step that conducts numerical analysis of the temperature field but does not conduct numerical analysis of the flow field in the moving state, after the second analyzing step ends; and a fourth analyzing step that conducts both numerical analysis of the flow field and numerical analysis of the temperature field in the moving state, after the third analyzing step ends. Accordingly, the convergence of the flow field and the convergence of the temperature field are able to be brought closer together after the third analyzing step ends. Therefore, compared with when the third analyzing step is not provided and numerical analysis is conducted on both the flow field and the temperature field together, the calculating load of the numerical analysis can be reduced, which enables the time that it takes to conduct the numerical analysis to be shortened.

Also, the first analyzing step and the second analyzing step may be alternately executed at a preset operating ratio in which the number of operations of the first analyzing step is greater than the number of operations of the second analyzing step. Further, when the flow field reaches a steady state in the first analyzing step or the second analyzing step, the first analyzing step or the second analyzing step may end and the third analyzing step may begin. Accordingly, compared with when both the numerical analysis of the flow field and the numerical analysis of the temperature field are always conducted together before the third analyzing step starts, the calculation load to bring the flow field to a steady state before the third analyzing step starts is reduced so the time required to conduct the numerical analysis can be shortened. Also, the change in the temperature field over time is gradual, so even if the first analyzing step and the second analyzing step are executed alternately at the operating ratio, there is not a large difference in the analysis results compared with when the numerical analysis of the flow field and the numerical analysis of the temperature field are always conducted together, i.e., when only the second analyzing step is executed.

Also, the operating ratio may be set based on the structure of the vehicle drive unit. Accordingly, even if the structure of the vehicle drive unit that is the target of the numerical analysis differs, the time required to conduct the numerical analysis can still be sufficiently shortened.

Also, when the temperature field reaches the steady state in the third analyzing step, the third analyzing step may end and the fourth analyzing step may begin. Accordingly, a solution that is sufficiently close to the solution of the temperature field that is ultimately obtained in the fourth analyzing step can be provided at the starting point of the fourth analyzing step, so the required calculating load from the start of the fourth analyzing step to the end of the fourth analyzing step can be reduced, which enables the time that it takes to conduct the numerical analysis to be reduced.

Also, the numerical analysis method of a vehicle drive unit may also include an initial temperature analyzing step that conducts numerical analysis of the temperature field but does not conduct numerical analysis of the flow field, in a state in which the moving body is assumed to be still. Also, the first analyzing step may start after the initial temperature analyzing step ends. Accordingly, after the solution of the temperature field becomes somewhat closer to the solution that is ultimately obtained, in a simplified state that is the static state in which it is assumed that the moving body is still in the initial temperature analyzing step, the first analyzing step is started based on that temperature field. Therefore, compared with when the initial temperature analyzing step is not provided, the operating load of the numerical analysis thereafter can be reduced, so the time that it takes to conduct the numerical analysis can be shortened. Also, in the initial temperature analyzing step, it is assumed that the moving body is in a static state so only the numerical analysis of the temperature field is conducted. Thus, that initial temperature analyzing step will not significantly increase the operating load.

Also, when the solution of the temperature field has converged in the initial temperature analyzing step, the initial temperature analyzing step may end and the first analyzing step may begin. Accordingly, compared with when the first analyzing step starts before the solution of the temperature field has converged in the initial temperature analyzing step, the calculating load of the numerical analysis in the first analyzing step and thereafter can be further reduced, so the time that it takes to conduct the numerical analysis can be shortened even more.

Also, the cooling medium may be cooling oil. Accordingly, the flow field and the temperature field can be numerically analyzed using the invention when the moving body that moves inside the vehicle drive unit is cooled by the cooling oil.

Also, the moving body may be a rotating member that generates heat and rotates about an axis. Accordingly, the flow field and the temperature field can be numerically analyzed using the invention, in a vehicle drive unit that has the rotating member. Incidentally, one example of the rotating member is a rotor with an electromagnetic coil of an electric motor.

Also, the moving body may be one of a pair of gears that are in mesh with each other. Accordingly, the flow field and the temperature field can be numerically analyzed using the invention, in a vehicle drive unit that has the pair of gears. Incidentally, with the pair of gears, heat is generated by friction contact between the teeth that are in mesh with each other, and that heat is dissipated outside of the case, for example, by the cooling medium.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein:

FIG. 1 is a block view of an example of the electrical structure of an electronic calculator that preferably executes the numerical analysis method according to the invention;

FIG. 2 is an image view of an example of a cross-section of the main portion of a vehicle drive unit (i.e., electric motor) that is the target of the numerical analysis (CAE analysis) according to the method of numerical analysis performed by the electronic calculator shown in FIG. 1;

DETAILED DESCRIPTION OF EMBODIMENTS

Figure 3:
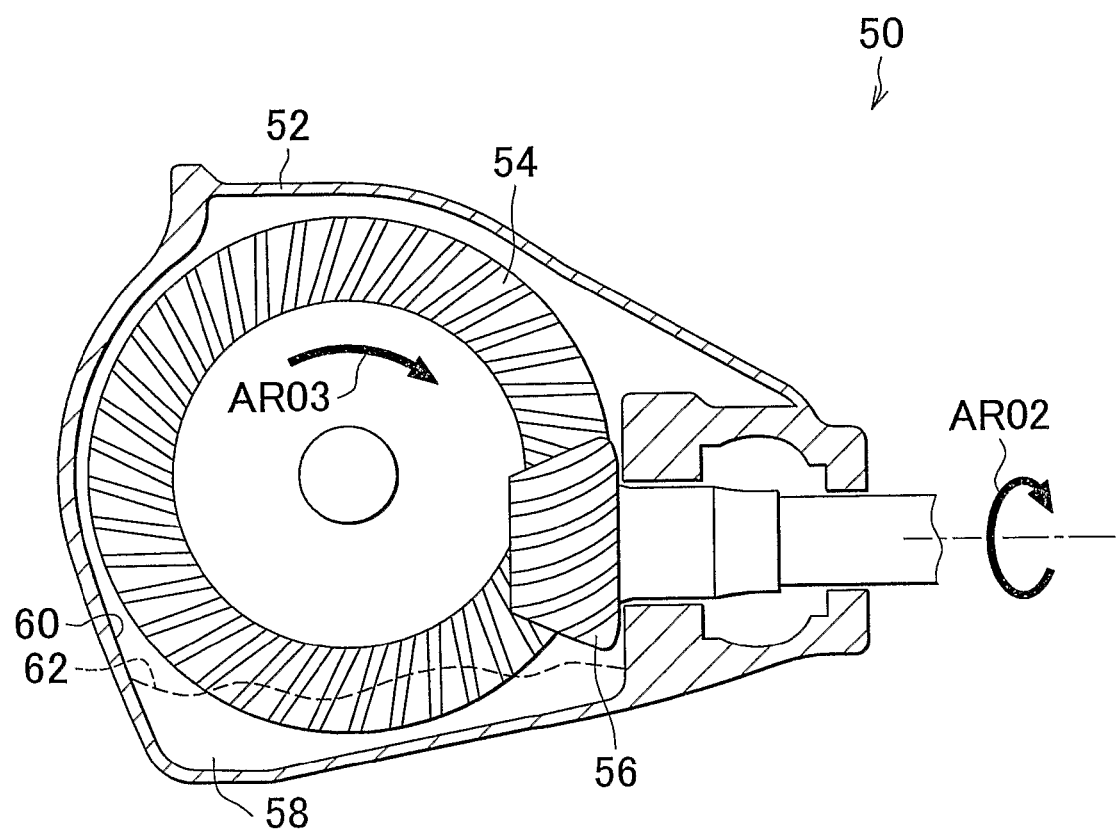
FIG. 3 is an image view of an example of a cross-section of the main portion of a vehicle drive unit (i.e., a differential gear unit) that differs from the vehicle drive unit shown in FIG. 2 that is the target of the numerical analysis according to the method of numerical analysis performed by the electronic calculator shown in FIG. 1.

Example embodiments of the invention will hereinafter be described in detail with reference to the accompanying drawings.

FIG. 1 is a block view of an example of the electrical structure of an electronic calculator 10 that executes the numerical analysis method according to the invention well. As shown in FIG. 1, the electronic calculator 10 is a computer that includes a CPU (Central Processing Unit) 12, RAM 14, ROM 16, a read-write device 18 that reads data and programs and the like from a recording medium such as a CD-ROM or a magnetic disk, or writes data and programs and the like onto that recording medium, a bus 20 that mediates the sending and receiving of data between the constituent elements of those devices, a display unit 22 such as a liquid crystal display for displaying the calculation results and the like of the CPU 12, and an input device 24 such as a keyboard and a mouse or the like.

The CPU 12 is a so-called computer control portion that processes and controls electronic information based on programs stored in advance in a portion of the ROM 16 and the like while using the temporary storage function of the RAM 14. For example, the CPU 12 executes so-called CAE (Computer Aided Engineering) according to a numerical analysis program stored in advance, receives the input of an initial condition such as an initial solution of the CAE analysis from the input device 24, and displays the results of the CAE analysis on the display unit 22. Also, the program such as the numerical analysis program may be written and stored beforehand via the read-write device 18 from a recording medium such as a CD-ROM on which the programs are recorded.

FIG. 2 is an image view of an example of a cross-section of the main portion of a vehicle drive unit 30 that is the target of the numerical analysis (CAE analysis) according to the numerical analysis method of the invention. This vehicle drive unit 30 is an electric motor (i.e., a motor) that is connected to driving wheels of a hybrid vehicle. As shown in FIG. 2, the vehicle drive unit 30 includes a case 32 that is fixed to the vehicle body, a motor rotor 34 that is a moving body that moves inside the case 32, and cooling oil 36 as the cooling medium that is fluid that fills a portion of the inside of the case 32 and contacts at least a portion of the motor rotor 34. The cooling oil 36 is a liquid that functions as a cooling medium for inhibiting the temperature of the motor rotor 34 from rising. This cooling oil 36 does not fill up the entire inside of the case 32 so it has a free surface 40 that is not constrained by an inside wall 38 of the case 32. The motor rotor 34 is a rotating member that has an electromagnetic coil and thus generates heat by being energized, and rotates about an axis as shown by the arrow AR01 in FIG. 2. A portion of this motor rotor 34 is immersed in the cooling oil 36 so the rotation of the motor rotor 34 agitates the cooling oil 36. Further, with the vehicle drive unit 30, the temperature of the cooling oil 36 rises from the heat generated by the motor rotor 34 when the motor rotor 34 is energized so that it will rotate (i.e., operate). In other words, the temperature of the cooling oil 36 rises as the motor rotor 34 continues to be rotated (i.e., operated).

FIG. 3 is an image view of an example of a cross-section of the main portion of a vehicle drive unit 50 that differs from the vehicle drive unit 30 shown in FIG. 2 that is the target of the numerical analysis according to the numerical analysis method of the invention. The vehicle drive unit 50 is a differential gear unit provided between a propeller shaft and the driving wheels of the vehicle. As shown in FIG. 3, the vehicle drive unit 50 includes a case 52 that is fixed to the vehicle body, a differential ring gear 54 that is a moving body that moves inside the case 52, a differential drive pinion 56 that is in mesh with the differential ring gear 54, and cooling oil 58 as the cooling medium that is a fluid that fills up a portion of the inside of the case 52 and contacts at least a portion of the differential ring gear 54. The differential ring gear 54 is coupled to the driving wheels, and the differential drive pinion 56 is coupled to the propeller shaft. The differential ring gear 54 and the differential drive pinion 56 together form a pair of gears that are in mesh with each other. As these gears rotate with their tooth surfaces in frictional contact with one another, they generate heat. For example, if the differential drive pinion 56 rotates in the direction of arrow AR02 in FIG. 3, the differential ring gear 54 will rotate in the direction of arrow AR03. Because a portion of the differential ring gear 54 is immersed in the cooling oil 58, that cooling oil 58 will be agitated by the rotation of the differential ring gear 54. The cooling oil 58 is a liquid that serves as a cooling medium for suppressing a rise in the temperature of the differential ring gear 54 and the differential drive pinion 56. This cooling oil 58 also serves as lubricating oil for the differential ring gear 54 and the differential drive pinion 56. The cooling oil 58 does not fill up the entire inside of the case 52, so it has a free surface 62 that is not constrained by the inside wall 60 of the case 52. Also, in the vehicle drive unit 50, the temperature of the cooling oil 58 rises from the heat generated by the friction at the tooth surface when the differential ring gear 54 and the differential drive pinion 56 both rotate while in mesh with each other. In other words, the temperature of the cooling oil 58 rises as the differential ring gear 54 continues to rotate.

Figure 4:
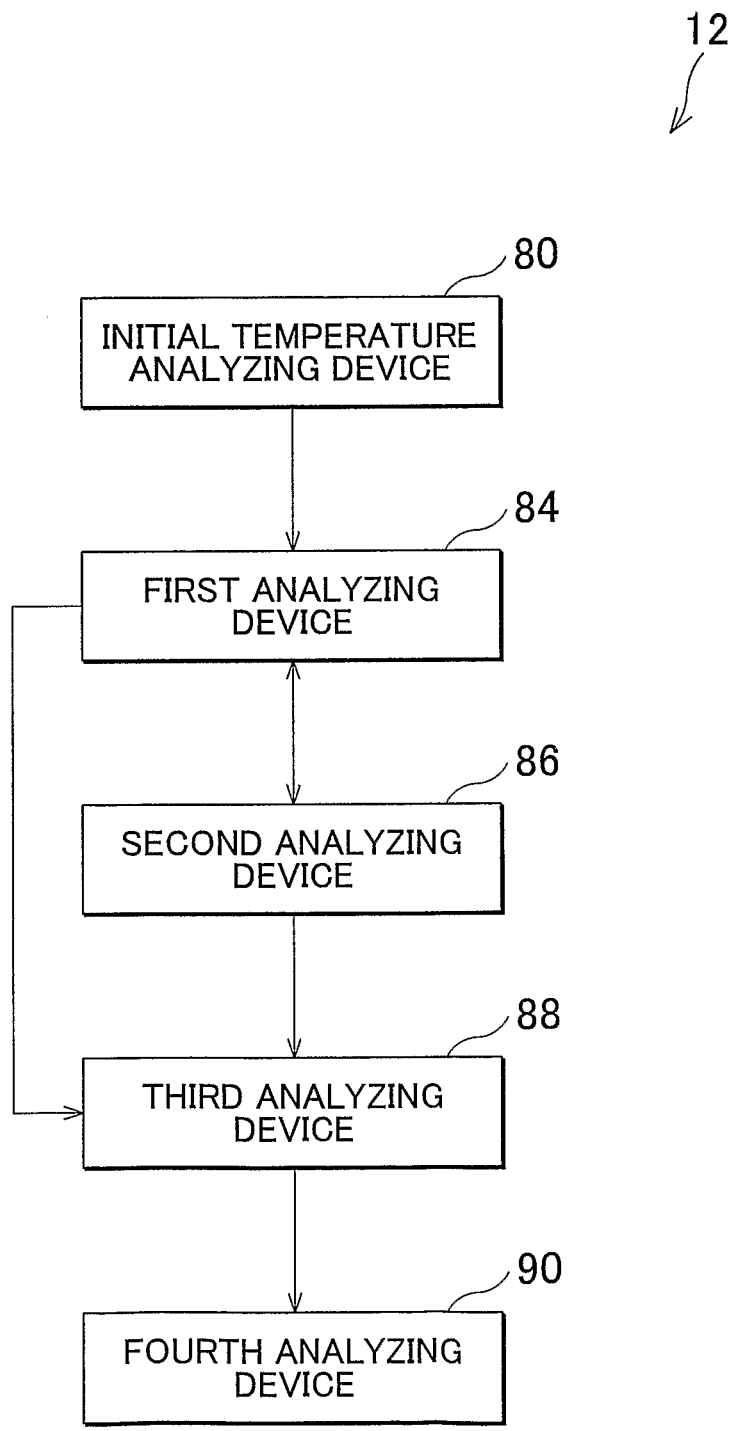
FIG. 4 is a functional block line diagram illustrating the main portion of the control function provided in the electronic calculator in FIG. 1.
Figure 5:
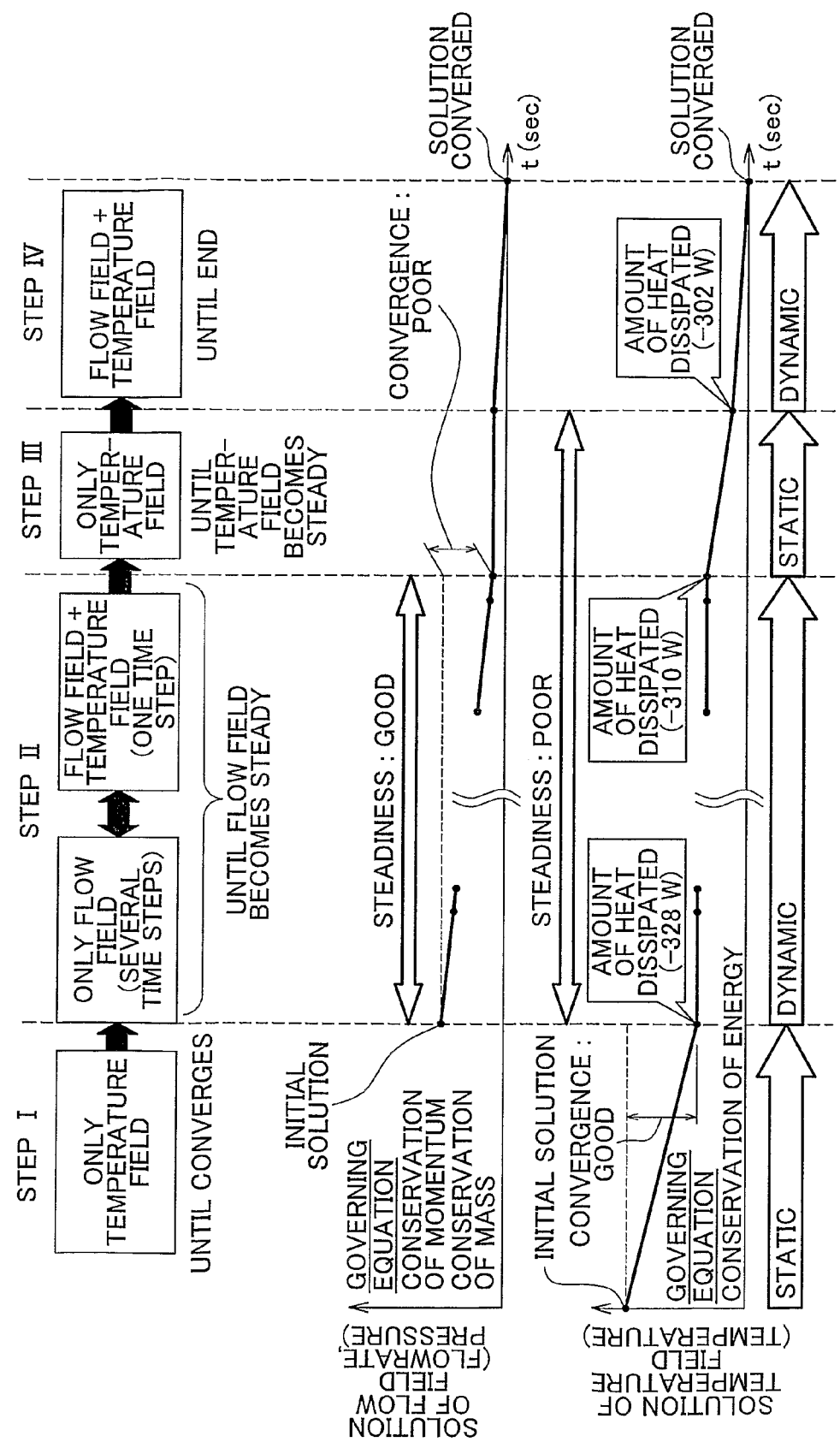
FIG. 5 is a schematic view of the flow of numerical analysis performed by the electronic calculator in FIG. 1, in an example in which the vehicle drive unit shown in FIG. 2 is the target of numerical analysis.

FIG. 4 is a functional block line diagram illustrating the main portion of the control function provided in the electronic calculator 10, and FIG. 5 is a schematic view of the flow of numerical analysis performed by the electronic calculator 10, in an example in which the vehicle drive unit 30 shown in FIG. 2 is the target of numerical analysis. Hereinafter, in the vehicle drive unit 30, control in which the flow field FLF of the cooling oil (i.e., the cooling medium) 36 and the temperature field FLT in the vehicle drive unit 30, or more specifically, the temperature field FLT of the cooling oil 36, are numerically analyzed will be described. Incidentally, the vehicle drive unit 30 is one example for describing the control function shown in FIG. 4. However, another vehicle drive unit other than the vehicle drive unit 30, such as the vehicle drive unit 50, may also be the target of numerical analysis.

As shown in FIG. 4, the electronic calculator 10 (or more specifically, the CPU 12) includes an initial temperature analyzing device 80, a first analyzing device 84, a second analyzing device 86, a third analyzing device 88, and a fourth analyzing device 90.

The initial temperature analyzing device 80 executes an initial temperature analyzing step 100 of the invention, i.e., conducts numerical analysis of the temperature field FLT but does not conduct numerical analysis of the flow field FLF. In this case, with the numerical analysis shown in FIG. 5, numerical analysis in a state in which the motor rotor 34, i.e., the moving body, is rotating is ultimately performed. However, the initial temperature analyzing device 80 assumes that the motor rotor 34 is still, and thus conducts numerical analysis of the temperature field FLT in a state in which it is assumed that the motor rotor 34 is still, i.e., in a static state. STEP I in FIG. 5 corresponds to the initial temperature analyzing step 100 that is executed by the initial temperature analyzing device 80. In STEP I in FIG. 5, numerical analysis is conducted with the assumption that the motor rotor 34 is still, but in STEPS II to IV that will be described later, that assumption is dismissed and numerical analysis is conducted with the assumption that the motor rotor 34 is rotating, i.e., in a dynamic state.

The governing equation of this temperature field FLT is a generally known energy conservation equation that is expressed by Expression (1) below, but will be simplified with constant assumptions. There are three of these constant assumptions and they are as follows. Assumption (1): The entire system that is the temperature field FLT is accounted for by a single and uniform physicality. Assumption (2): The temperature within the system is a mass system with no distribution. Assumption (3): The advection of internal energy from the flowrate is disregarded. Incidentally, in Expression (1) below, "t" is the time within the system, i.e., the set time of the numerical analysis, "$e_{tot}$" is the internal energy per unit volume (in units of J/m$^3$, for example), "vector v" is the flowrate, "p" is the pressure within the system, "$k_{eff}$" is the effective thermal conductivity, "T" is the temperature, e.g., the temperature of the cooling oil 36 in FIG. 2, "h" is the enthalpy, "vector j" is the position vector, "tensor $\tau_{eff}$" is the shear tensor, and "$q_h$" is the amount of heat generated per unit volume (in units of W/m$^3$, for example).

[Expression 1]

$$\frac{\partial e_{tot}}{\partial t} + \nabla \cdot [\vec{v}(e_{tot} + p)] = \nabla \cdot \left( k_{eff} \nabla T - \sum_j h_j \vec{j}_j + \vec{\tau}_{eff} \cdot \vec{v} \right) + q_h \quad (1)$$

Figure 6:
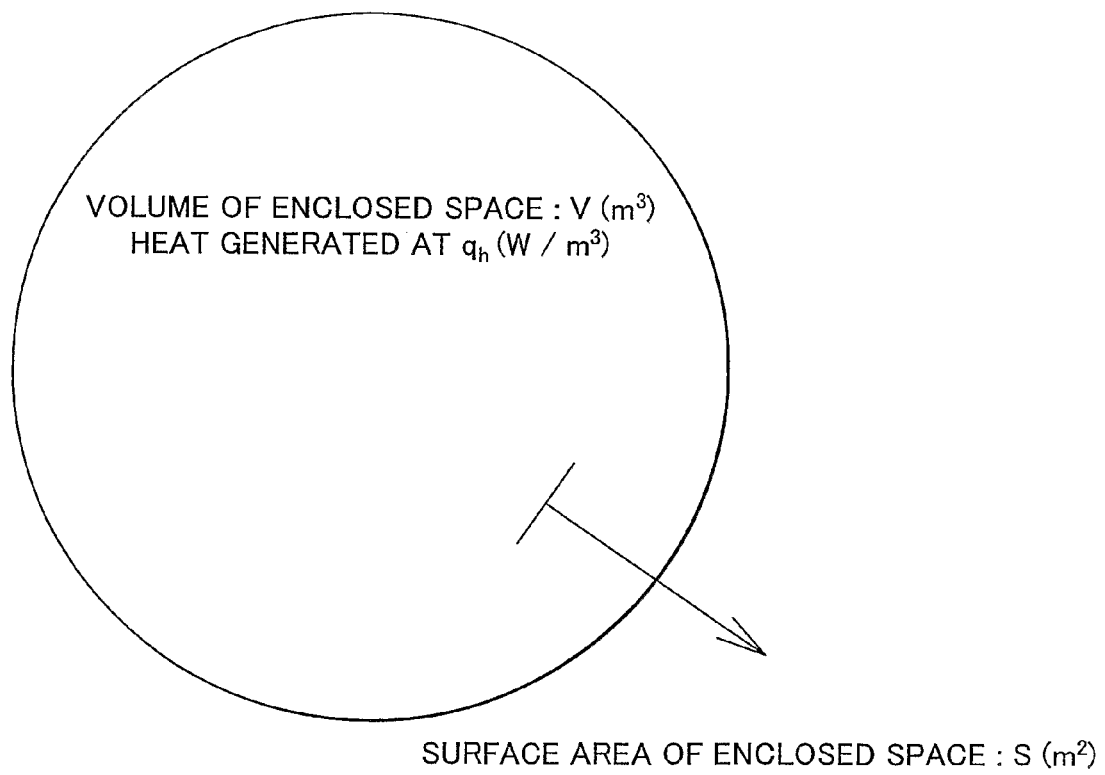
FIG. 6 is an image view an enclosed space representing the temperature field that is used in the explanation when deriving a governing equation of the temperature field in numerical analysis performed by the electronic calculator in FIG. 1.

From Assumptions (1) and (2), the fluid that forms this system is a single phase, uncompressed, and uniform physicality, so Expression (1) can be rewritten as Expression (2) below. Then in Expression (2), volume integration is performed with the entire system and Expression (2) is converted into a change-over-time equation of the total energy. More specifically, as shown in the image view of FIG. 6, volume integration is performed with the entire system, with the assumption that the system is an enclosed space in which the system is closed and the surface shape does not change over time. That is, if the left side of Expression (2) is volume integrated and the result is expressed by Expression (3) below, Expression (2) can be converted into Expression (4). Then at the surface of the enclosed space, e.g., at the surface of the cooling oil 36 that contacts the inside wall 38 in FIG. 2, the flowrate v equals zero (i.e., flowrate v=0), so the second term on the right side of Expression (4) is zero, as shown in Expression (5) below, and Expression (6) below can be derived from Expression (4) as the change-over-time equation of the total energy. Incidentally, in Expressions (2) to (6), "$E_{tot}$" is the result obtained after performing volume integration on $e_{tot}$, i.e., the total energy (in units of "J", for example), "V" is the volume of the enclosed space in FIG. 6, e.g., the volume of the cooling oil 36 in FIG. 2, "S" is the surface area of that enclosed space, e.g., the surface area of the cooling oil 36 in FIG. 2, and "$Q_h$" is the result obtained after performing volume integration on $q_h$, e.g., the total amount of heat generated (in units of "W", for example), e.g., the amount of heat generated by the motor rotor 34 in terms of FIG. 2. For example, the amount of heat generated by the motor rotor 34 may be given as a constant value of approximately 302 W.

[Expression 2]

$$\frac{\partial e_{tot}}{\partial t} = \nabla \cdot (k_{eff} \nabla T + \vec{\tau}_{eff} \cdot \vec{v} - (e_{tot} + p)\vec{v}) + q_h \quad (2)$$

-continued

[Expression 3]

$$\int \frac{\partial e_{tot}}{\partial t} dV = \frac{\partial E_{tot}}{\partial t} \quad (3)$$

[Expression 4]

$$\frac{\partial E_{tot}}{\partial t} = \oint k_{\text{eff}} (\nabla T) \cdot d\vec{S} + \oint (\vec{\tau}_{\text{eff}} - e_{tot} - p)\vec{v} \cdot d\vec{S} + Q_h \quad (4)$$

[Expression 5]

$$\oint (\vec{\tau}_{\text{eff}} - e_{tot} - p)\vec{v} \cdot d\vec{S} = 0 \quad (5)$$

[Expression 6]

$$\frac{\partial E_{tot}}{\partial t} = \oint k_{\text{eff}} (\nabla T) \cdot d\vec{S} + Q_h \quad (6)$$

Here, the total energy $E_{tot}$ shown in Expression (6) is the sum of the thermal energy and the kinetic energy. If the change over time in that kinetic energy is able to be ignored because of Assumption (3), Expression (7) below is obtained for the left side of Expression (6) above. Also, the first term on the right side of Expression (6) is a term for heat dissipation from the boundary surface, so Expression (10) below can be derived via Expressions (8) and (9) below that indicate the surface heat flux $q_{flux}$. As a result, Expression (6) can be converted into Expression (11) below from Expressions (7) and (10) below. As described above, the governing equation of the temperature field FLT in this example embodiment can be converted into Expression (11) below from Expression (1) above by introducing Assumptions (1) to (3) above. The solution to Expression (11) which is an ordinary differential equation is Expression (12) below. Incidentally, in Expressions (7) to (12) below, "$E_{the}$" is the thermal energy, "$E_{kin}$" is the kinetic energy, "$\rho$" is the density of the fluid that forms the system, e.g., the density of the cooling oil 36, "$c_p$" is the specific heat of the fluid, e.g., the specific heat of the cooling oil 36, "$T_0$" is the initial value of the temperature T, i.e., the temperature T when time t=0, "$h_{out}$" is the heat transfer coefficient and is a parameter that indicates the ease with which heat is able to transfer from the cooling oil 36 to the case 32 in terms of FIG. 2, for example, "$T_{out}$" is the outside temperature outside the enclosed space shown in FIG. 6, i.e., the temperature of the case 32 in terms of FIG. 2, for example, and "$T_{wall}$" is the surface temperature of that enclosed space and is same value as the temperature T from Assumption (2).

[Expression 7]

$$\frac{dE_{tot}}{dt} = \frac{dE_{the}}{dt} + \frac{dE_{kin}}{dt} \quad (7)$$

$$= \frac{d}{dt} \int \rho c_p (T - T_0) dV + \frac{d}{dt} \int \frac{\rho}{2} v^2 dV$$

$$\approx \frac{d}{dt} \int \rho c_p (T - T_0) dV$$

$$= \rho c_p V \frac{dV}{dt}$$

[Expression 8]

$$\vec{q}_{flux} = k_{\text{eff}} \nabla T \quad (8)$$

[Expression 9]

$$\vec{q}_{flux} = h_{out} (T_{out} - T_{wall}) \quad (9)$$

[Expression 10]

$$\oint k_{\text{eff}} (\nabla T) \cdot d\vec{S} = h_{out} (T_{out} - T_{wall}) S \quad (10)$$

[Expression 11]

$$\rho c_p V \frac{dT}{dt} = h_{out} S (T_{out} - T) + Q_h \quad (11)$$

[Expression 12]

$$T(t) = \left( T_{out} + \frac{Q_h}{h_{out} S} \right) + \left( T_0 - \left( T_{out} + \frac{Q_h}{h_{out} S} \right) \right) \exp\left( -\frac{h_{out} S}{c_p \rho V} t \right) \quad (12)$$

Returning now to FIG. 4, the initial temperature analyzing device 80 conducts numerical analysis of the temperature field FLT but does not conduct numerical analysis of the flow field FLF as is described above. However, in the numerical analysis of the temperature field FLT, first, an initial condition of this temperature field FLT, such as the initial temperature $T_0$ of the temperature T of the cooling oil 36 (i.e., the cooling oil temperature T) or the like is given. This initial temperature analyzing device 80 advances the set time t of the temperature field FLT by a predetermined time $t_x$ every one time step with this initial condition of the temperature field FLT as the starting point, and sequentially calculates each parameter such as the cooling oil temperature T and the like that determines the temperature field FLT every one time step, i.e., calculates each parameter over time, by solving Expression (11) that is the governing equation of the temperature field FLT by a method typically used in numerical analysis by computer, i.e., by calculating Expression (12) that is the solution to Expression (11). The initial temperature analyzing device 80 conducts the numerical analysis of this temperature field FLT until the cooling oil temperature T, i.e., the solution (see FIG. 5) of the temperature field FLT, converges. In other words, it is determined whether the solution of the temperature field FLT has converged, and if the solution of the temperature field FLT has converged, the numerical analysis of this temperature field FLT ends. Here, when it is said that the solution converges, it means that the solution stabilizes as the set time t passes. For example, the initial temperature analyzing device 80 determines that the solution of the temperature field FLT has converged when the variation width of the solution with respect to the elapsed time of the set time t is within a range for determining whether the solution has converged that has been empirically established beforehand. The predetermined time $t_x$ is a period of time that is extremely short yet long enough to determine that the numerical analysis result of the temperature field FLT is constant as the set time t passes. With the numerical analysis by the first analyzing device 84, the second analyzing device 86, the third analyzing device 88, and the fourth analyzing device 90, which will be described later, the set time t of one or both of the temperature field FLT and the flow field FLF is advanced by the predetermined time $t_x$ for each time step, and the numerical analysis result is sequentially calculated at each one time step by a method that is typically used in numerical analysis by computer, just like the numerical analysis by the initial temperature analyzing device 80 described above.

The first analyzing device 84 executes a first analyzing step 104 of the invention. That is, the first analyzing device 84 conducts numerical analysis of the flow field FLF but does not conduct numerical analysis of the temperature field FLT, in a state in which the motor rotor 34 is rotating, i.e., a moving state (a dynamic state) in which the moving body is moving. At the beginning of the numerical analysis of the flow field FLF, an initial condition such as an initial solution of the flow field FLF is given. Then the first analyzing device 84 starts the numerical analysis, i.e., starts to execute the first analyzing step 104, when the solution of the temperature field FLT has converged in the numerical analysis of the temperature field FLT by the initial temperature analyzing device 80. At this time, the first analyzing device 84 does not conduct the numerical analysis of the temperature field FLT, so it is assumed that the temperature field FLT obtained by the numerical analysis right before the start of first analyzing step 104 is maintained, or more specifically, it is assumed that the temperature field FLT when STEP I in FIG. 5 ends, or, if the first analyzing step 104 is executed again after a second analyzing step 106 that will be described later, that the temperature field FLT when that second analyzing step 106 ends, is maintained, and the first analyzing device 84 conducts only the numerical analysis of the flow field FLF. Incidentally, the solution of the flow field FLF (see FIG. 5) is the pressure or flowrate of the cooling oil 36, for example.

Next, the governing equation of the flow field FLF will be described. The governing equation of the flow field FLF is Expression (13) below, which is a generally known Navier-Stokes equation, Expression (14) below, which is a continuous equation, and an advection equation of the boundary surface (i.e., free surface). Incidentally, in Expressions (13) and (14), "p" is the pressure within the system, such as the pressure of the cooling oil 36 in FIG. 2, "Re" is a Reynolds number, such as the Reynolds number of the cooling oil 36 in FIG. 2, "u" is the velocity of the cooling oil 36, "x" is the position, "f" is an external force term (i.e., a rotational transfer term), such as a value determined by the rotation of the motor rotor 34 in terms of FIG. 2, and subscripts "i=1, 2, 3" and "j=1, 2, 3" of u, x, and f in Expressions (13) and (14) below are each directional components in a Cartesian coordinate system (i.e., an orthogonal coordinate system). Also, "t" in Expression (13) is the time within the system, i.e., the set time of the numerical analysis, just like in Expression (11) described above.

[Expression 13]

$$\frac{\partial u_i}{\partial t} + \frac{\partial (u_i u_j)}{\partial x_j} = -\frac{\partial p}{\partial x_i} + \frac{1}{Re}\frac{\partial^2 u_i}{\partial x_j \partial x_j} + f_i \quad (13)$$

[Expression 14]

$$\frac{\partial u_i}{\partial x_i} = 0 \quad (14)$$

The second analyzing device 86 executes the second analyzing step 106 of the invention. That is, the second analyzing device 86 conducts numerical analysis of both the flow field FLF and the temperature field FLT, in a state in which the motor rotor 34 is rotating, i.e., a moving state (a dynamic state) in which the moving body is moving. The second analyzing device 86 starts to conduct the numerical analysis of both the flow field FLF and the temperature field FLT, i.e., starts to execute the second analyzing step 106, after the numerical analysis by the first analyzing device 84. However, at this time, the numerical analysis starts with the immediately prior flow field FLF and the temperature field FLT, i.e., with the flow field FLF and the temperature field FLT from right before the second analyzing step 106 is started. Conducting the numerical analysis of both the flow field FLF and the temperature field FLT means conducting numerical analysis of both the flow field FLF and the temperature field FLT so that the governing equation of the flow field FLF and the governing equation of the temperature field FLT are satisfied simultaneously.

The order in which the numerical analyses are conducted by the first analyzing device 84 and the second analyzing device 86 will now be described. The numerical analysis by the second analyzing device 86 starts after the numerical analysis by the first analyzing device 84 ends, as described above, but various patterns for conducting these numerical analyses are possible. For example, one possible pattern involves the first analyzing device 84 conducting numerical analysis in the first analyzing step 104 until the set time t has advanced a period of time that has been empirically set in advance, and then the second analyzing device 86 conducting numerical analysis in the second analyzing step 106 until the flow field FLF reaches a steady state. In this example embodiment, however, a different pattern is employed. More specifically, the first analyzing device 84 and the second analyzing device 86 both conduct numerical analysis alternately at a preset operating ratio $RT_{OP}$, i.e., the first analyzing step 104 and the second analyzing step 106 are repeatedly executed alternately at the operating ratio $RT_{OP}$. This operating ratio $RT_{OP}$ is the ratio of the number of time steps for which the first analyzing step 104 is executed and the number of time steps for which the second analyzing step 106 is executed, and is empirically determined beforehand based on the structure of the vehicle drive unit 30 and the like such that the number of time steps (i.e., the number of operations or calculations) of the first analyzing step 104 is greater than the number of time steps of the second analyzing step 106.

The first analyzing device 84 and the second analyzing device 86 each determine whether the flow field FLF is in a steady state in the first analyzing step 104 or the second analyzing step 106, and if the flow field FLF is in a steady state, the first analyzing step 104 or the second analyzing step 106 is ended. In other words, the repeated execution of the first analyzing step 104 and the second analyzing step 106 at the operating ratio $RT_{OP}$ ends when the flow field FLF reaches a steady state in either the first analyzing step 104 or the second analyzing step 106. In describing the steady state, the operational expression used in the numerical analysis derived from the governing equation of the flow field FLF includes an unsteady-state term that continues to vibrate as the set time t passes, and a steady-state term that does not vibrate or does not continue to vibrate as the set time t passes. The steady state of the flow field FLF is a state in which all of the steady-state terms do not change or substantially stop changing as the set time t passes. For example, when the variation width of the steady-state term with respect to the elapsed time of the set time t is within a range empirically set beforehand for determining the steady state, that flow field FLF is determined to be in a steady state. That is, when the unsteady-state term and the steady-state term are both taken into account, the steady state of the flow field FLF may be said to be a state in which the fluctuation range of the solution of the flow field FLF continues to stay within a fixed range as the set time t passes. STEP II in FIG. 5 corresponds to the first analyzing step 104 executed by the first analyzing device 84 and the second analyzing step 106 executed by the second analyzing device 86. For example, in STEP II of FIG. 5, when the operating ratio $RT_{OP}$ in which the second analyzing step 106 is executed for one time step each time the first analyzing step 104 is executed for 100 time steps is set in advance, the second analyzing step 106 is executed for one time step after the first analyzing step 104 is executed for 100 time steps, and then the first analyzing step 104 is executed again, and this sequence is repeated until the flow field FLF reaches a steady state.

The third analyzing device 88 executes a third analyzing step 108 of the invention. That is, after the second analyzing step 106 has ended, the third analyzing device 88 conducts numerical analysis of the temperature field FLT but does not conduct numerical analysis of the flow field FLF in a state in which the motor rotor 34 is rotating, i.e., in a moving state (a dynamic state). Here, the phrase "after the second analyzing step 106 has ended" means both immediately after the second analyzing step 106 has ended, as well as after the first analyzing step 104 has ended when that first analyzing step 104 is executed after the second analyzing step 106 has ended, because the first analyzing Step 104 and the second analyzing step 106 are repeatedly executed alternately at the operating ratio $RT_{OP}$ in STEP II of FIG. 5 as described above. When the first analyzing device 84 determines that the flow field FLF is in a steady state in the first analyzing step 104 or the second analyzing device 86 determines that the flow field FLF is in a steady state in the second analyzing step 106, i.e., when STEP II in FIG. 5 has ended because the flow field FLF has reached a steady state, the third analyzing device 88 starts to execute the third analyzing step 108. At this time, the third analyzing device 88 does not conduct numerical analysis of the flow field FLF. Therefore, it is assumed that the flow field FLF obtained by numerical analysis right before this third analyzing step 108 starts, i.e., the flow field FLF when STEP II in FIG. 5 ends, is maintained and the third analyzing device 88 conducts only numerical analysis of the temperature field FLT.

In the third analyzing step 108, the third analyzing device 88 determines whether temperature field FLT has reached the steady state. When the temperature field FLT reaches a steady state, the third analyzing step 108 ends. The steady state of the temperature field FLT is similar to the steady state of the flow field FLF described above. That is, it is a state in which all of the steady-state terms of the operational expression used in the numerical analysis derived from the governing equation of the temperature field FLT do not change or substantially stop changing as the set time t passes. Also, the method for determining whether the temperature field FLT is in a steady state may be the same as that used to determine whether the flow field FLF is in a steady state. STEP III in FIG. 5 corresponds to the third analyzing step 108 executed by the third analyzing device 88.

The fourth analyzing device 90 executes a fourth analyzing step 110 of the invention. That is, after the third analyzing step 108 ends, the fourth analyzing device 90 conducts numerical analysis of both the flow field FLF and the temperature field FLT in a state in which the motor rotor 34 is rotating, i.e., in a moving state (a dynamic state). If the third analyzing device 88 has determined in the third analyzing step 108 that the temperature field FLT is in the steady state, i.e., if STEP III in FIG. 5 has ended because the temperature field FLT has reached a steady state, the fourth analyzing device 90 starts to execute the fourth analyzing step 110. In STEP III that is a preceding step in FIG. 5, numerical analysis of the flow field FLF is not conducted, so the fourth analyzing device 90 starts numerical analysis of the flow field FLF from the flow field FLF at the end of STEP II in FIG. 5.

Then the fourth analyzing device 90 executes the fourth analyzing step 110 until a preset end condition for the fourth analyzing step 110 is satisfied. When it is determined that an end analysis condition, as that end condition, is satisfied, the fourth analyzing device 90 ends the fourth analyzing step 110. When the fourth analyzing device 90 ends the fourth analyzing step 110, the final converged solutions of the flow field FLF and the temperature field FLT are obtained. The end analysis condition is satisfied when the governing equation of the flow field FLF and the governing equation of the temperature field FLT are simultaneously satisfied, and the heat balance, which is the difference between the total amount of heat generated $Q_h$ of the temperature field FLT and the total amount of heat dissipated from the cooling oil 36, is within a preset allowable heat balance range. This allowable heat balance range is determined empirically in advance such that the total amount of heat generated $Q_h$ of the temperature field FLT and the total amount of heat dissipated from the cooling oil 36 can be determined to be equal when the heat balance is within that range. Also, in the thermal equilibrium state of the temperature field FLT in which the total amount of generated heat $Q_h$ is equal to the total amount of dissipated heat, the cooling oil temperature T is converged so the end analysis condition that the heat balance of the temperature field FLT be within the allowable heat balance range may be replaced with a condition that the cooling oil temperature T of the temperature field FLT be converged. For example, it may be determined that the cooling oil temperature T has converged when the variation width of the cooling oil temperature T with respect to the elapsed time of the set time t is within a range empirically set in advance for determining the convergence of the cooling oil temperature T. Incidentally, STEP IV in FIG. 5 corresponds to the fourth analyzing step 110 executed by the fourth analyzing device 90.

In FIG. 5, STEPS I to IV that are the steps of the numerical analysis of the vehicle drive unit 30 are shown in the upper portion of the drawing. The change in the solution of the flow field FLF and the change in the solution of the temperature field FLT are schematically shown in image views in the middle and lower portions of the drawing. FIG. 5 is a view showing the passing of the set time t of the flow field FLF and the temperature field FLT from STEP I toward STEP IV.

In STEP I in FIG. 5, only the numerical analysis of the temperature field FLT is conducted, so the point at which the solution of the temperature field FLT which is the cooling oil temperature T, for example, approaches the converged solution from the initial solution, e.g., the initial value T0 of the cooling oil temperature T, with the passing of the set time t is shown.

In STEP II, the numerical analysis of the flow field FLF starts to be conducted in addition to the numerical analysis of the temperature field FLT, so the point at which the solution of the flow field FLF that is the pressure and flowrate of the cooling oil 36, for example, approaches the converged solution from the initial solution as the set time t passes is shown. Also, in STEP II, numerical analysis of both the flow field FLF and the temperature field FLT is conducted, so the points at which both the solution of the flow field FLF and the solution of the temperature field FLT approach their respective converged solutions are shown.

In STEP III, only numerical analysis of the temperature field FLT is conducted; numerical analysis of the flow field FLF is not conducted. Therefore, the point at which the solution of the temperature field FLT approaches the converged solution from the solution at the end of STEP II with the passing of the set time t, while the solution of the flow field FLF is maintained at the end of STEP II, is shown.

In STEP IV, numerical analysis of both the flow field FLF and the temperature field FLT is conducted, so the points at which the solution of the flow field FLF and the solution of the temperature field FLT approach their respective converged solutions from the solutions at the end of STEP III are shown. Also, the points at which the solution of the flow field FLF and the solution of the temperature field FLT at the end of STEP IV reach their respective converged solutions are shown.

In FIG. 5, it is evident from the change in the solutions of the flow field FLF and the temperature field FLT as the set time t passes that the convergence of the solution of the temperature field FLT is better than the convergence of the solution of the flow field FLF, but the steadiness of the solution of the flow field FLF is better than the steadiness of the solution of the temperature field FLT. Here, the convergence is indicated by the slope until the solution becomes stable with respect to a horizontal axis that is the temporal axis in FIG. 5. That is, the convergence is indicated by the amount of change in a comparable dimensionless solution, for example, as the set time t passes. The convergence becomes better as the slope becomes larger. Also, the steadiness is indicated by the elapsed time of the set time t that it takes for the solution to converge in FIG. 5. The steadiness becomes better as the elapsed time becomes shorter. All of the steps, from STEP I to STEP IV in FIG. 5 are provided taking into account the difference between this kind of convergence and steadiness of the solutions of the flow field FLF and the temperature field FLT.

Figure 7:
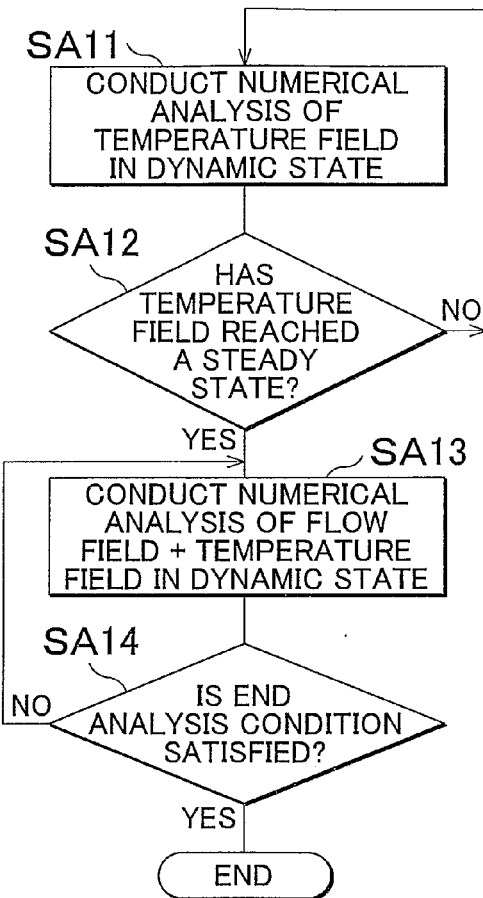
FIG. 7 is a flowchart illustrating the main portion of a control operation of the electronic calculator in FIG. 1, i.e., the control operation that performs numerical analysis of the flow field and temperature field shown in FIG. 5.
Figure 7:
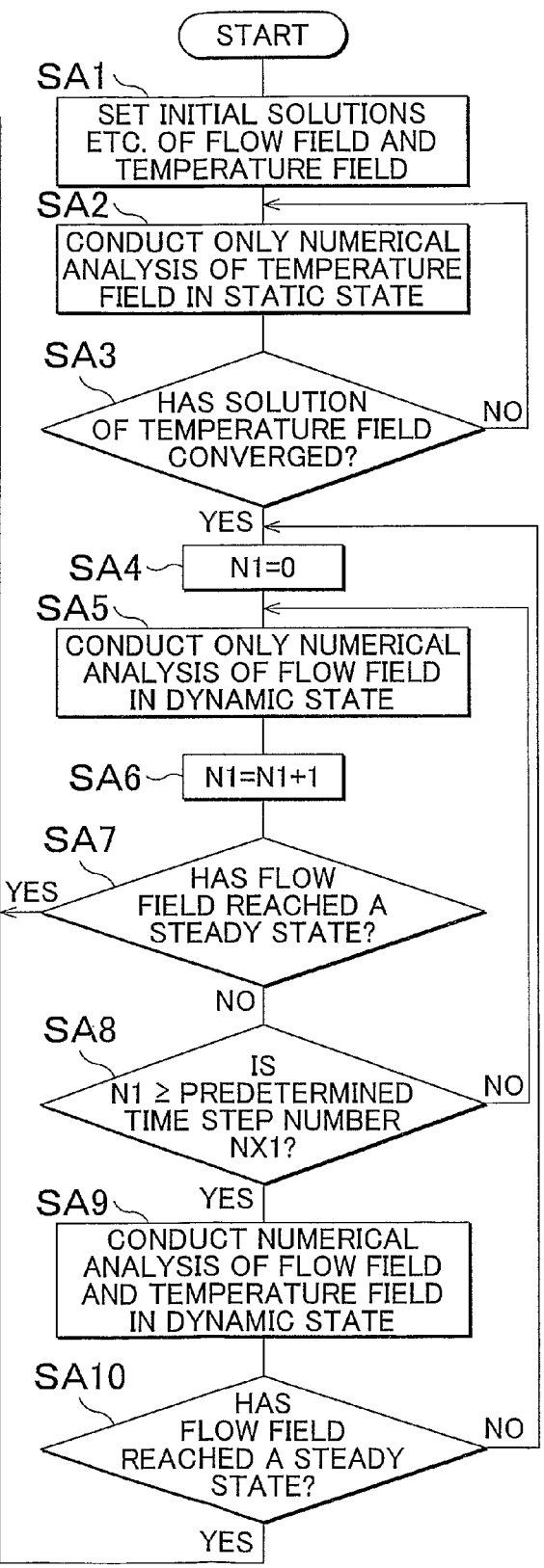
Figures 8, 9:
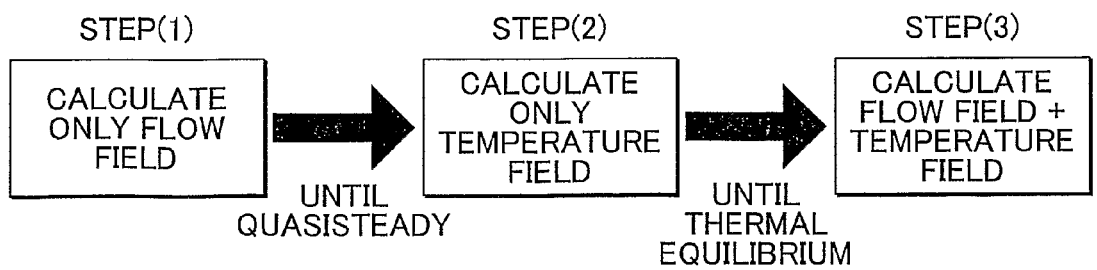
FIG. 8 is a view of the phenomena that are taken into account in CAE analysis conventionally performed in each technical field, arranged in a chart.
FIG. 9 is a schematic view of the flow of CAE analysis of the flow field and the temperature field of the vehicle drive unit performed before the inventor came up with the idea of the invention described in this application.
Figure 10:
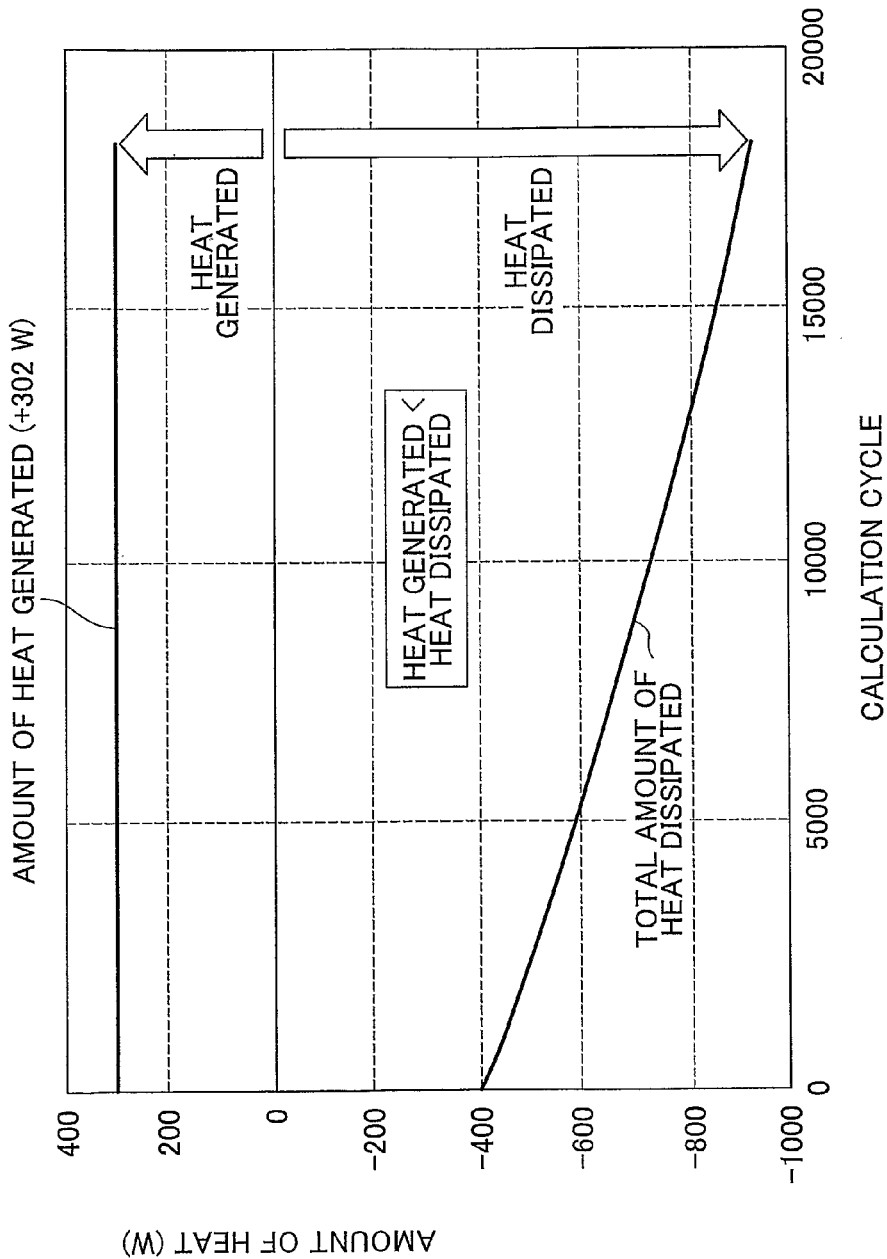
FIG. 10 is a graph comparing the amount of heat generated with the total amount of heat dissipated in STEP [2] shown in FIG. 9.

FIG. 7 is a flowchart illustrating the main portion of the control operation of the electronic calculator 10, i.e., the control operation that performs the numerical analysis of the flow field and the temperature field shown in FIG. 5. Incidentally, steps SA2 and SA3 in FIG. 7 correspond to STEP I in FIG. 5, step SA4 to step SA10 in FIG. 7 correspond to STEP II in FIG. 5, steps SA11 and SA12 in FIG. 7 correspond to STEP III in FIG. 5, and steps SA13 and SA14 in FIG. 7 correspond to STEP IV in FIG. 5. Also, the flowchart shown in FIG. 7 may also be applied to numerical analysis of a vehicle drive unit other than the vehicle drive unit 30. However, in the description of FIG. 7, to facilitate understanding, an example in which the flowchart is applied to the numerical analysis of the flow field FLF and the temperature field FLT of the vehicle drive unit 30 will be described, just as in the descriptions of FIGS. 4 and 5 above.

First, in step SA1, initial conditions such as the initial solutions of the flow field FLF and the temperature field FLT of the vehicle drive unit 30 are set. After step SA1, the process proceeds on to step SA2.

In step SA2, it is assumed that the motor rotor 34 is still, and only numerical analysis of the temperature field FLT is conducted in the state in which the motor rotor 34 is still, i.e., in the static state. After step SA2, the process proceeds on to step SA3.

In step SA3, it is determined whether the solution of the temperature field FLT has converged. If the determination in step SA3 is yes, i.e., if the solution of the temperature field FLT has converged, then the process proceeds on to step SA4. If, on the other hand the determination in step SA3 is no, the process returns to step SA2, i.e., the numerical analysis in step SA2 continues until the solution of the temperature field FLT converges. Incidentally, steps SA2 and SA3 correspond to the initial temperature analyzing device 80 and the initial temperature analyzing step 100.

In step SA4, a counter N1 indicative of the number of time steps for which the numerical analysis of the flow field FLF has been conducted in step SA5, which is the next step, is set to an initial value of zero. After step SA4, the process proceeds on to step SA5.

In step SA5, only the numerical analysis of the flow field FLF is conducted in a state in which the motor rotor 34 is rotating (i.e., in a dynamic state). After step SA5, the process proceeds on to step SA6.

In step SA6, the counter N1 is increased by the number of time steps for which the numerical analysis of the flow field FLF in step SA5 has been conducted. More specifically, the numerical analysis is conducted for one time step with one execution of step SA5, so the counter N1 is increased by one. After step SA6, the process proceeds on to step SA7.

In step SA7, it is determined whether the flow field FLF has reached a steady state. If the determination in step SA7 is yes, i.e., if the flow field FLF has reached a steady state, the process jumps ahead to step SA11. If, on the other hand, the determination in step SA7 is no, the process proceeds on to step SA8.

In step SA8, it is determined whether the numerical analysis of the flow field FLF in step SA5 has continued to be executed for a predetermined number of time steps NX1. More specifically, it is determined whether the counter N1 has become equal to or greater than that predetermined number of time steps NX1. The predetermined number of time steps NX1 used in step SA8 is the number of time steps for which the first analyzing step 104 is executed when the second analyzing step 106 is executed for only one time step in the operating ratio $RT_{OP}$ of the first analyzing step 104 and the second analyzing step 106 that is preset in STEP II in FIG. 5. For example, if the operating ratio $RT_{OP}$ that is preset in STEP II in FIG. 5 is such that the second analyzing step 106 is executed for one time step each time the first analyzing step 104 is executed for 100 time steps, the predetermined number of time steps NX1 is 100. The operating ratio $RT_{OP}$ does not always have to be the same value if the vehicle drive unit that is the target of numerical analysis is different. For example, the characteristics of each vehicle drive unit are different, so a different value may be set for each vehicle drive unit as appropriate, e.g., the operating ratio $RT_{OP}$ may be set based on the structure of the vehicle drive unit. If the determination in step SA8 is yes, i.e., if the counter N1 is equal to or greater than the predetermined number of time steps NX1, the process proceeds on to step SA9. If, on the other hand, the determination in step SA8 is no, the process returns to step SA5. Incidentally, steps SA4 to SA8 correspond to the first analyzing device 84 and the first analyzing step 104.

In step SA9, numerical analysis of the flow field FLF and numerical analysis of the temperature field FLT are simultaneously conducted in the state in which the motor rotor 34 is rotating (i.e., in a dynamic state). More specifically, this numerical analysis is conducted for one time step. After step SA9, the process continues on to step SA10.

In step SA10, it is determined whether the flow field FLF has reached a steady state. If the determination in step SA10 is yes, i.e., if the flow field FLF has reached a steady state, the process proceeds on to step SA11. If, on the other hand, the determination in step SA10 is no, the process returns to step SA4. Incidentally, steps SA9 and SA10 correspond to the second analyzing device 86 and the second analyzing step 106.

In step SA1, only the numerical analysis of the temperature field FLT is conducted in the state in which the motor rotor 34 is rotating (i.e., in a dynamic state). After step SA11, the process proceeds on to step SA12.

In step SA12, it is determined whether the temperature field FLT has reached a steady state. If the determination in step SA12 is yes, i.e., if the temperature field FLT has reached a steady state, then the process proceeds on to step SA13. If, on the other hand, the determination in step SA12 is no, the process returns to step SA11, i.e., the numerical analysis in step SA11 is continued until the temperature field FLT reaches a steady state. Incidentally, steps SA11 and SA12 correspond to the third analyzing device 88 and the third analyzing step 108.

In step SA13, the numerical analysis of the flow field FLF and the numerical analysis of the temperature field FLT are conducted simultaneously in the state in which the motor rotor 34 is rotating (i.e., in a dynamic state). After step SA13, the process proceeds on to step SA14.

In step SA14, it is determined whether the end condition (i.e., the end analysis condition) preset in the fourth analyzing step 110 is satisfied. This end analysis condition is satisfied when the governing equation of the flow field FLF and the governing equation of the temperature field FLT are simultaneously satisfied, and the heat balance of the temperature field FLT is within the preset allowable heat balance range. If the determination in step SA14 is yes, i.e., if the end analysis condition is satisfied, this cycle of the routine in the flowchart ends. Then the converged solutions of the flow field FLF and the temperature field FLT can be obtained. If, on the other hand, the determination in step SA14 is no, the process returns to step SA13, i.e., the numerical analysis in step SA13 is continued until the end analysis condition is satisfied. Incidentally, the steps SA13 and SA14 correspond to the fourth analyzing device 90 and the fourth analyzing step 110.

As described above, according to the numerical analysis method of this example embodiment, the first analyzing step 104 executed by the first analyzing device 84 is a step that conducts numerical analysis of the flow field FLF but does not conduct numerical analysis of the temperature field FLT, in a moving state in which the moving body is moving, e.g., in a state in which the motor rotor 34 is rotating. The second analyzing step 106 executed by the second analyzing device 86 is a step that conducts both numerical analysis of the flow field FLF and numerical analysis of the temperature field FLT in the moving state after the first analyzing step 104 has ended. Accordingly, in the vehicle drive unit 30 and 50, the convergence of the temperature field FLT is higher than that of the flow field FLF, while the steadiness of the temperature field FLT is lower than that of the flow field FLF. However, before conducting both the numerical analysis of the flow field FLF and the numerical analysis of the temperature field FLT, the numerical analysis is conducted on the flow field FLF first in the first analyzing step 104 before the numerical analysis is conducted on the temperature field FLT. As a result, compared with when the numerical analysis of the flow field FLF and the numerical analysis of the temperature field FLT are conducted together from the start without going through the first analyzing step 104, the calculation load of the numerical analysis on the electronic calculator 10 is less, so the time that it takes for the electronic calculator 10 to perform CAE analysis able to be reduced. That is, the flow field FLF and the temperature field FLT of the vehicle drive unit 30 and 50 can be calculated appropriately.

Also, according to the numerical analysis method of this example embodiment, the third analyzing step 108 executed by the third analyzing device 88 is a step that conducts numerical analysis of the temperature field FLT but does not conduct numerical analysis of the flow field FLF in the moving state, after the second analyzing step 106 has ended. Also, the fourth analyzing step 110 executed by the fourth analyzing device 90 is a step that conducts both the numerical analysis of the flow field FLF and the numerical analysis of the temperature field FLT in the moving state, after the third analyzing step 108 has ended. Accordingly, the convergence of the flow field FLF and the convergence of the temperature field FLT can be brought closer together after the third analyzing step 108 ends. As a result, compared with when the third analyzing step 108 is not provided and both the numerical analysis of the flow field FLF and the numerical analysis of the temperature field FLT are conducted in the fourth analyzing step 110, the calculation load of the numerical analysis on the electronic calculator 10 is less, so the time that it takes to perform the numerical analysis can be shortened.

Also, according to the numerical analysis method of this example embodiment, the first analyzing step 104 and the second analyzing step 106 are executed alternately at the preset operating ratio $RT_{OP}$ in which the number of operations (i.e., the number of time steps) of the first analyzing step 104 is greater than the number of operations of the second analyzing step 106. Also, according to the numerical analysis method of this example embodiment, when the flow field FLF reaches a steady state in the first analyzing step 104 or the second analyzing step 106, that first analyzing step 104 or that second analyzing step 106 ends, i.e., STEP II in FIG. 5 ends, and the third analyzing step 108 starts. Therefore, compared with when both the numerical analysis of the flow field FLF and the numerical analysis of the temperature field FLT are always conducted together before the third analyzing step 108 starts, the calculation load to bring the flow field FLF to a steady state before the third analyzing step 108 starts is reduced so the time required to conduct the numerical analysis can be shortened. Also, the change in the temperature field FLT as the set time t passes is gradual, so in STEP II in FIG. 5, even if the first analyzing step 104 and the second analyzing step 106 are executed alternately at the operating ratio $RT_{OP}$, there is not a large difference in the analysis results such as the solutions of the flow field FLF and the temperature field FLT at the end of STEP II compared with when the numerical analysis of the flow field FLF and the numerical analysis of the temperature field FLT are always conducted together, i.e., when only the second analyzing step 106 is executed. Also, in STEP II in FIG. 5, the flow field FLF is not made to reach a steady state by executing only the first analyzing step 104. Instead, the second analyzing step 106 is executed intermittently as appropriate, so the flow field FLF can be brought to a steady state while the correlation between the flow field FLF and the temperature field FLT is appropriately maintained.

Also, according to the numerical analysis method of this example embodiment, the operating ratio $RT_{OP}$ is determined based on the structure of the vehicle drive unit 30, for example. Accordingly, even if the structure of the vehicle drive unit that is the target of the numerical analysis is different from that of the vehicle drive unit 30, the time required to conduct the numerical analysis can still be sufficiently shortened.

Further, according to the numerical analysis method of this example embodiment, when the temperature field FLT reaches a steady state in the third analyzing step 108, that third analyzing step 108 ends and the fourth analyzing step 110 begins. Therefore, a solution that is sufficiently close to the solution of the temperature field FLT that is ultimately obtained in the fourth analyzing step 110 (i.e., the converged solution) can be provided at the starting point of the fourth analyzing step 110, so the required calculating load from the start of the fourth analyzing step 110 to the end of the fourth analyzing step 110 can be reduced, which enables the time that it takes to conduct the numerical analysis to be reduced.

Moreover, according to the numerical analysis method of this example embodiment, the initial temperature analyzing step 100 executed by the initial temperature analyzing device 80 is a step that conducts numerical analysis of the temperature field FLT but does not conduct numerical analysis of the flow field FLF, in the static state in which it is assumed that the motor rotor 34, i.e., the moving body, is still. Also, according to the numerical analysis method of this example embodiment, the first analyzing step 104 is started after the initial temperature analyzing step 100 ends. Accordingly, after the solution of the temperature field FLT becomes somewhat closer to the converged solution that is ultimately obtained than the initial solution of the temperature field FLT, the first analyzing step 104 is started based on that temperature field FLT. As a result, compared with when the initial temperature analyzing step 100 is not provided, the operating load of the numerical analysis thereafter can be reduced, so the time that it takes to conduct the numerical analysis can be shortened. Also, in the initial temperature analyzing step 100, it is assumed that the state is a static state in which the moving body is still, so only the numerical analysis of the temperature field FLT is conducted. Therefore, that initial temperature analyzing step 100 will not significantly increase the operating load on the electronic calculator 10.

Further, according to the numerical analysis method of this example embodiment, when the solution of the temperature field FLT converges in the initial temperature analyzing step 100, the initial temperature analyzing step 100 ends and the first analyzing step 104 begins. Therefore, compared with when the first analyzing step 104 starts, i.e., STEP II in FIG. 5 starts, before the solution of the temperature field FLT has converged in the initial temperature analyzing step 100, the calculating load of the numerical analysis in the first analyzing step 104 and thereafter, i.e., of the numerical analysis in STEP II and thereafter, can be further reduced, so the time that it takes to conduct the numerical analysis can be shortened even more.

Also, according to the numerical analysis of this example embodiment, the cooling medium that forms the flow field FLF and the temperature field FLT is the cooling oil 36 and 58, for example, so the flow field FLF and the temperature field FLT can be numerically analyzed using the numerical analysis method of this example embodiment when the moving body, i.e., the differential gear 54 and the motor rotor 34 that moves inside the vehicle drive unit 30 and 50, is cooled by the cooling oil 36 and 58.

Further, according to the numerical analysis method of this example embodiment, the vehicle drive unit 30 provided with the motor rotor 34 that generates heat and rotates about an axis, and the cooling oil 36 that fills a portion of the inside of the case 32 and contacts at least a portion of the motor rotor 34, for example, is the target of numerical analysis, so the flow field FLF and the temperature field FLT can be numerically analyzed using the numerical analysis method of this example embodiment in this kind of vehicle drive unit 30.

Also, according to the numerical analysis method of this example embodiment, the vehicle drive unit 50 provided with the differential ring gear 54 that is one of a pair of meshed gears, and the cooling oil 58 that fills a portion of the inside of the case 52 and contacts at least a portion of the differential gear 54, for example, is the target of numerical analysis, so the flow field FLF and the temperature field FLT can be numerically analyzed using the numerical analysis method of this example embodiment in this kind of vehicle drive unit 50.

Further, according to the numerical analysis method of this example embodiment, numerical analysis is conducted in order from STEP I to STEP IV, as shown in FIG. 5. Accordingly, numerical analysis results of equivalent accuracy can be obtained compared with when the flow field FLF and the temperature field FLT are numerically analyzed simultaneously from beginning to end. Moreover, if for example the time that it takes the electronic calculator 10 to conduct the numerical analysis is approximately one year when the flow field FLF and the temperature field FLT are numerically analyzed simultaneously from beginning to end, that time may be able to be shorted to approximately 360 hours with the same processing performance. Also, it is also conceivable that the time that it takes to conduct the numerical analysis can be shortened by parallelizing the electronic calculator 10. However, this would require larger equipment and would increase costs, so there is a limit in terms of efficiency even with the parallelization of the electronic calculator 10. The numerical analysis method of the example embodiment is advantageous from this perspective as well.

Although a preferable example embodiment of the invention has been described in detail with reference to the drawings, the invention is in no way limited to this example embodiment. That is, the invention may also be carried out in another mode.

For example, in the example embodiment described above, the amount of heat $Q_h$ generated by the motor rotor 34 is given as a constant value. However, numerical analysis is also possible when that amount of generated heat $Q_h$ changes with respect to the set time t.

Also, in FIG. 5 of the example embodiment described above, numerical analysis is conducted in order from STEP I to STEP IV. However, a numerical analysis method that starts from STEP II instead of STEP I (i.e., in which STEP I is eliminated) is also possible. Further, a numerical analysis method that proceeds from STEP II to STEP IV instead of from STEP III to STEP IV (i.e., in which STEP III is eliminated) is also possible. Also, depending on the required accuracy of the numerical analysis results and the like, the numerical analysis may also be ended while it is in the middle of being conducted, and the solutions of the flow field FLF and the temperature field FLT at that time may be obtained. For example, the numerical analysis may be ended at the end of STEP III.

Moreover, numerical analysis in which STEP III and STEP IV in FIG. 5 are eliminated and the ultimate converged solutions of the flow field FLF and the temperature field FLT are obtained by continuing STEP II is also possible. In this case, in STEP I, for example, the first analyzing step 104 and the second analyzing step 106 may be repeatedly executed alternately at the operating ratio $RT_{OP}$, or the numerical analysis in the first analyzing step 104 may first be conducted for only an empirically preset number of time steps, and then the second analyzing step 106 may be conducted until the final converged solutions of the flow field FLF and the temperature field FLT are obtained.

Also, in FIG. 5 of the example embodiment described above, STEP I, i.e., the initial temperature analyzing step 100, ends when the solution of the temperature field FLT has converged. Alternatively, however, an upper limit or the like may be provided for the number of time steps for which the initial temperature analyzing step 100 is executed, and the initial temperature analyzing step 100 may be cut short and the next step executed before the solution of the temperature field FLT has converged.

Also, in FIG. 5 of the example embodiment described above, STEP II ends when the flow field FLF reaches a steady state, and STEP III ends when the temperature field FLT reaches a steady state. Alternatively, however, the conditions for these to end may be conditions other than that the flow field FLF and the temperature field FLT have reached the steady states.

Also, in the example embodiment described above, the motor rotor 34 in FIG. 2 and the differential ring gear 54 in FIG. 3 that are the moving body both rotate. Alternatively, however, the moving body may also be a piston or the like that moves in a reciprocating motion.

Further, in the vehicle drive unit 30 and 50 of the example embodiment described above, the fluid that functions as the cooling medium is the cooling oil 36 and 58, but it may also be a fluid other than oil.

Although not described here, the invention may be embodied with various changes, modifications or improvements, without departing from the spirit and scope of the invention.

The invention claimed is:

1. A numerical analysis method of a vehicle drive unit that is provided with a moving body that moves inside a case and a cooling medium that is a fluid that fills a portion of the inside of the case and contacts at least a portion of the moving body, and in which the temperature of the fluid medium rises as the moving body continues to move, the numerical analysis method numerically analyzing a temperature field of the cooling medium and a flow field of the cooling medium, comprising: a first analyzing step, performed by an electronic calculator, that conducts numerical analysis of the flow field but does not conduct numerical analysis of the temperature field in a moving state in which the moving body is moving; a second analyzing step, performed by an electronic calculator, that conducts both numerical analysis of the flow field and numerical analysis of the temperature field in the moving state, after the first analyzing step ends; a third analyzing step, performed by an electronic calculator, that conducts numerical analysis of the temperature field but does not conduct numerical analysis of the flow field in the moving state, after the second analyzing step ends; and a fourth analyzing step, performed by an electronic calculator, that conducts both numerical analysis of the flow field and numerical analysis of the temperature field in the moving state, after the third analyzing step ends, wherein the first analyzing step and the second analyzing step are alternately executed at a preset operating ratio in which the number of operations of the first analyzing step is greater than the number of operations of the second analyzing step; and when the flow field reaches a steady state in the first analyzing step or the second analyzing step, the first analyzing step or the second analyzing step ends and the third analyzing step begins.

2. The numerical analysis method of a vehicle drive unit according to claim 1, characterized by further comprising:
a third analyzing step (108) that conducts numerical analysis of the temperature field but does not conduct numerical analysis of the flow field in the moving state, after the second analyzing step (106) ends; and
a fourth analyzing step (110) that conducts both numerical analysis of the flow field and numerical analysis of the temperature field in the moving state, after the third analyzing step (108) ends.

3. The numerical analysis method of a vehicle drive unit according to claim 2, characterized in that the first analyzing step (104) and the second analyzing step (106) are alternately executed at a preset operating ratio in which the number of operations of the first analyzing step (104) is greater than the number of operations of the second analyzing step (106); and when the flow field reaches a steady state in the first analyzing step (104) or the second analyzing step (106), the first analyzing step (104) or the second analyzing step (106) ends and the third analyzing step (108) begins.

4. The numerical analysis method of a vehicle drive unit according to claim 3, characterized in that the operating ratio is set based on the structure of the vehicle drive unit (30, 50).

5. The numerical analysis method of a vehicle drive unit according to any one of claims 2 through 4, characterized in that when the temperature field reaches the steady state in the third analyzing step (108), the third analyzing step (108) ends and the fourth analyzing step (110) begins.

6. The numerical analysis method of a vehicle drive unit according to any one of claims 1 through 5, characterized by further including an initial temperature analyzing step (100) that conducts numerical analysis of the temperature field but does not conduct numerical analysis of the flow field, in a state in which the moving body is assumed to be still, wherein the first analyzing step (104) starts after the initial temperature analyzing step (100) ends.

7. The numerical analysis method of a vehicle drive unit according to claim 6, characterized in that when the solution of the temperature field has converged in the initial temperature analyzing step (100), the initial temperature analyzing step (100) ends and the first analyzing step (104) begins.

8. The numerical analysis method of a vehicle drive unit according to any one of claims 1 through 7, characterized in that the cooling medium is cooling oil (36, 58).

\* \* \* \* \*